United States Patent
Hussain et al.

(10) Patent No.: US 6,889,561 B2
(45) Date of Patent: May 10, 2005

(54) MASS FLOWMETER AND METHOD FOR CORRECTING THE MEASUREMENT SIGNAL OF A MASS FLOWMETER

(75) Inventors: Yousif A. Hussain, Weston Fevell (GB); Edward P. Jukes, Wellingborough (GB)

(73) Assignee: Krohne A.G., Basel (CH)

( * ) Notice: Subject to any disclaimer, the term of this patent is extended or adjusted under 35 U.S.C. 154(b) by 18 days.

(21) Appl. No.: 10/625,084

(22) Filed: Jul. 23, 2003

(65) Prior Publication Data
US 2004/0112144 A1 Jun. 17, 2004

(30) Foreign Application Priority Data
Dec. 16, 2002 (DE) .......................................... 102 58 962

(51) Int. Cl.[7] ................................................ G01F 1/84
(52) U.S. Cl. ................................................ 73/861.357
(58) Field of Search .......................... 73/861, 861.354, 73/861.355, 861.356, 861.357

(56) References Cited

U.S. PATENT DOCUMENTS

| | | | | |
|---|---|---|---|---|
| 5,381,697 A | * | 1/1995 | van der Pol ........... | 73/861.356 |
| 5,576,500 A | * | 11/1996 | Cage et al. ............ | 73/861.357 |
| 5,773,727 A | | 7/1998 | Kishiro et al. | |
| 5,796,012 A | | 8/1998 | Gomi et al. | |
| 5,827,979 A | * | 10/1998 | Schott et al. .......... | 73/861.357 |
| 5,850,039 A | * | 12/1998 | Van Cleve et al. ..... | 73/861.357 |
| 6,164,140 A | * | 12/2000 | Kalinoski ............... | 73/861.357 |
| 6,327,915 B1 | * | 12/2001 | Van Cleve et al. ..... | 73/861.357 |
| 6,397,685 B1 | * | 6/2002 | Cook et al. ............ | 73/861.357 |
| 6,516,674 B1 | * | 2/2003 | Poremba ................ | 73/861.357 |

\* cited by examiner

*Primary Examiner*—Edward Lefkowitz
*Assistant Examiner*—Corey D. Mack
(74) *Attorney, Agent, or Firm*—Cesari and McKenna, LLP; John F. McKenna

(57) ABSTRACT

Disclosed is a method for correcting the measurement signal of a mass flowmeter for flowing media of the type which works on the Coriolis principle and has at least one straight measuring tube conveying the flowing medium, at least one oscillation generator acting on the measuring tube, at least one measurement value sensor detecting Coriolis forces and/or Coriolis oscillations based on Coriolis forces and outputting a measurement signal and a supporting tube accommodating the measuring tube, the oscillation generator and the measurement value sensor, whereby the measuring tube and the supporting tube are connected to one another in a manner excluding relative axial movements and the axial spacing of the fixing points of the supporting tube on the measuring tube represents the oscillation length of the measuring tube. The method includes the steps of detecting the stress state of the measuring tube, detecting the stress state of the supporting tube, and correcting the measurement signal on the basis of the detected stress state of the measuring tube and the detected stress state of the supporting tube. A flowmeter for implementing the method is also disclosed.

5 Claims, 1 Drawing Sheet

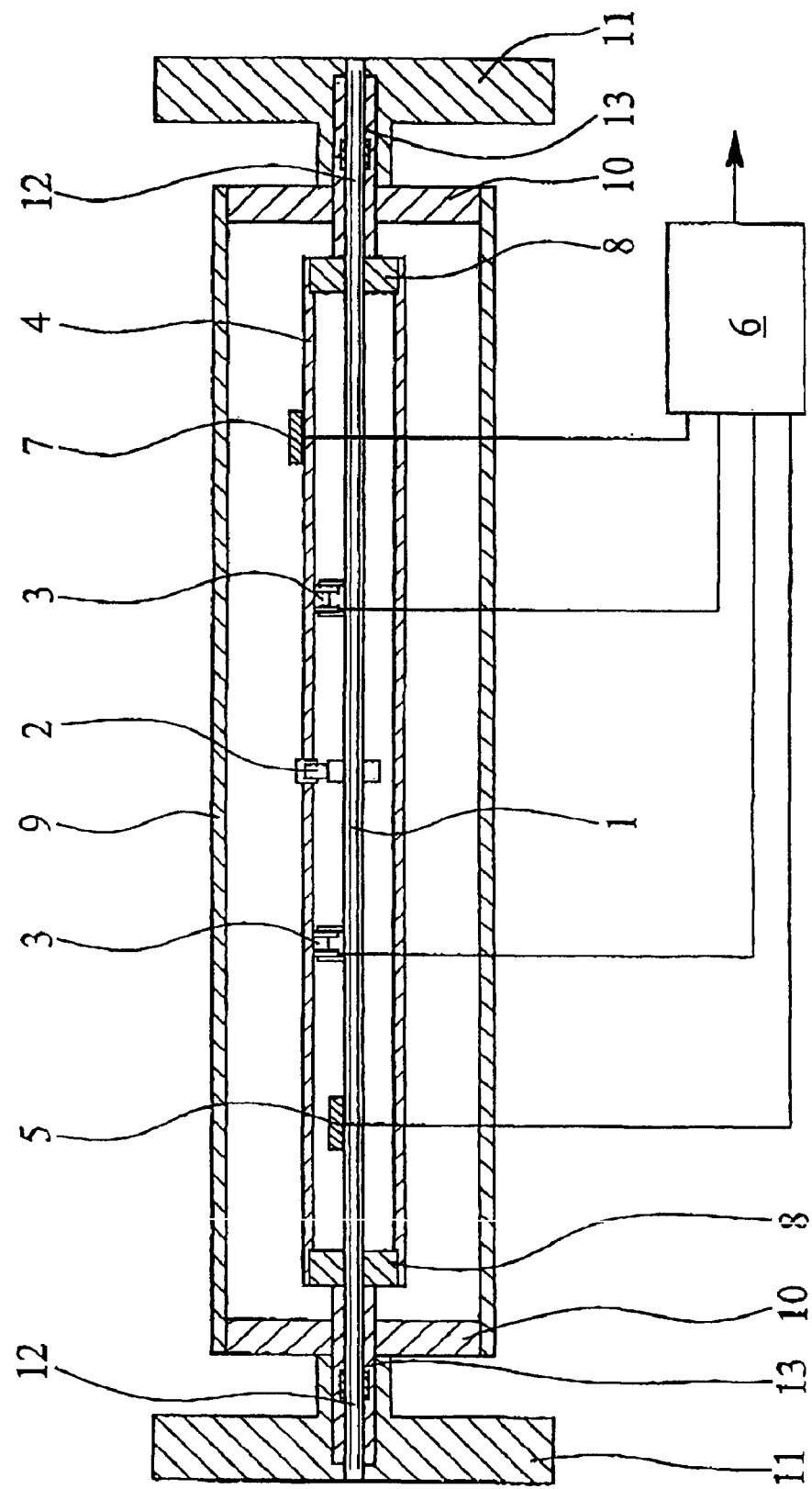

MASS FLOWMETER AND METHOD FOR CORRECTING THE MEASUREMENT SIGNAL OF A MASS FLOWMETER

BACKGROUND OF THE INVENTION

1. Field of the Invention

The invention relates to a mass flowmeter for flowing media which works on the Coriolis principle, with at least one straight measuring tube conveying the flowing medium, with at least one oscillation generator acting on the measuring tube, with at least one measurement value sensor detecting Coriolis forces and/or Coriolis oscillations based on Coriolis forces and outputting a measurement signal, with a supporting tube accommodating the measuring tube, the oscillation generator and the measurement value sensor, with a stress sensor for detecting the stress state of the measuring tube and with a correction device for correcting the measurement signal, whereby the measuring tube and the supporting tube are connected to one another in a manner excluding relative axial movements and the axial spacing of the fixing points of the supporting tube to the measuring tube represents the oscillation length of the measuring tube and whereby the measurement value sensor and the stress sensor detecting the stress state of the measuring tube are connected to the correction device, in order to feed to the correction device the measurement signal and the stress signal outputted by the stress sensor detecting the stress state of the measuring tube.

The invention further relates to a method for correcting the measurement signal of a mass flowmeter for flowing media, which works on the Coriolis principle and has at least one straight measuring tube conveying the flowing medium, at least one oscillation generator acting on the measuring tube, at least one measurement value sensor detecting Coriolis forces and/or Coriolis oscillations based on Coriolis forces and outputting a measurement signal and a supporting tube accommodating the measuring tube, the oscillation generator and the measurement value sensor, whereby the measuring tube and the supporting tube are connected to one another in a manner excluding relative axial movements and the axial spacing of the fixing points of the supporting tube to the measuring tube represents the oscillation length of the measuring tube and whereby the stress state of the measuring tube is detected.

With mass flowmeters for flowing media which work on the Coriolis principle, so-called Coriolis mass flowmeters, a distinction is basically made between, on the one hand, devices whose measuring tube is designed curved, e.g. loop-shaped, and on the other hand, devices whose measuring tube is essentially straight. Furthermore, a distinction is made with the Coriolis mass flowmeters in question between, on the one hand, those that have only one measuring tube, and on the other hand, those that have two measuring tubes. In the case of the forms of embodiment of the Coriolis mass flowmeters with two measuring tubes, these can lie in a row or parallel to one another from the flow technology standpoint.

Forms of embodiment of Coriolis mass flowmeters with which the measuring tube is designed straight, or with which the measuring tubes are designed straight, can, in view of the mechanical structure, be produced simply and consequently at relatively low cost. The Coriolis mass flowmeters obtainable in this way are compact and lead to only low pressure loss.

The drawback with such Coriolis mass flowmeters with which the measuring tube is designed straight, or with which the measuring tubes are designed straight, is that both length changes of thermal origin and stresses of thermal origin as well forces and moments acting from outside lead to measurement errors and to mechanical damage, i.e. to stress cracks.

2. Description of the Prior Art

A mass flowmeter and a method for correcting the measurement signal of a mass flowmeter, as described at the outset, are known for example from DE 42 24 397 C1. With the Coriolis mass flowmeter described there, there is provided, as a stress sensor for detecting the stress state of the measuring tube, a length-change sensor which detects changes in the oscillation length of the measuring tube in order to correct the measurement signal in dependence on the oscillation length and the stress.

Due to the fact that a length-change sensor detecting changes in the oscillation length of the measuring tube is provided in the case of this Coriolis mass flowmeter known from the prior art, a change in the oscillation length and in the axial stress state of the measuring tube influencing the oscillation frequency of the measuring tube can be taken into account, as a result of which measurement errors can be reduced or eliminated. With the additional provision of a temperature sensor, it is possible to reduce or eliminate measurement errors based on temperature changes of the measuring tube on the one hand and those based on forces acting on the measuring tube from the outside on the other hand. The length-change signals originating from the length-change sensor are a direct measure of changes in the oscillation length of the measuring line, irrespective of their origin, and an indirect measure of changes in the axial stress state of the measuring tube, also irrespective of their origin. The length-change sensor for detecting the changes in the oscillation length of the measuring tube thus makes it possible to detect changes in the oscillation length of the measuring tube and changes in the axial stress state of the measuring tube and to reduce or eliminate errors based thereon in the measurement signal when determining the value of the mass flow rate.

As far as the measurement errors arising due to temperature changes are concerned, the following further applies: the temperature dependence of the modulus of elasticity influences the oscillation frequency and the flexibility of the measuring tube and thus the measurement signal outputted by the measurement value sensor. As a result of this knowledge, a temperature sensor detecting the temperature of the measuring tube is provided for the measurement-signal correction dependent on the measuring-tube temperature. In this regard, reference is also made to the article "Direct mass flow rate measurement, in particular with the Coriolis method" by W. Steffen and Dr. W. Stumm in "measurement, testing and automation", 1987, pp. 301–305.

Furthermore, a Coriolis mass flowmeter is known from the prior art, with which the ongoing temperature dependence of the measurement signal is taken into account by the fact that a temperature sensor detecting the temperature of the supporting tube is provided for the measurement-signal correction dependent on the supporting-tube temperature. This is described in DE 36 32 800 A1 and in EP 0 261 435 B1. The correction measures described there make provision such that the temperature-sensor signals generated by the two temperature sensors are inputted into a correction device which is intended to remove the temperature influence on the measurement signal.

All the previously described devices and measures that have been taken with Coriolis mass flowmeters to obtain a measurement-signal correction dependent on stress and temperature have led to an improvement in the ascertainment of the mass flow rate signal. The known measures are not, however, fully satisfactory, since it emerges that the ascertained mass flow rate signals continue to be bound up with errors, even though small ones.

SUMMARY OF THE INVENTION

Proceeding from this, the problem of the invention is to make available such a Coriolis mass flowmeter and such a method for correcting the measurement signal of a Coriolis mass flowmeter, with which an ongoing correction of the measurement signal and thus of the ascertained value for the mass flow rate can be achieved.

Proceeding from the Coriolis mass flowmeter described at the outset, the previously derived and expounded problem is solved by the fact that a stress sensor detecting the stress state of the supporting tube is provided, and the stress sensor detecting the stress state of the supporting tube is connected to the correction device in order to feed to the correction device the stress signal outputted by the stress sensor detecting the stress state of the supporting tube, so that a measurement signal can be outputted by the correction device that is corrected on the basis of the stress signal outputted by the stress sensor detecting the stress state of the measuring tube and the stress signal outputted by the stress sensor detecting the stress state of the supporting tube.

According to the invention, therefore, in addition to the stress sensor for measuring the stress state of the measuring tube, there is provided a further stress sensor, i.e. one which detects the stress state of the supporting tube. The oscillation length and the axial stress state of the measuring tube, on the one hand, and the length and the axial stress state of the supporting tube, on the other hand, can thus be ascertained, whereby length changes and the stress state of the measuring tube and the supporting tube are influenced to a differing degree by different influencing factors.

If the information concerning the stress state originating from the measuring tube and the supporting tube, respectively, is used jointly for the measurement-signal correction dependent on length and stress, a more effective correction of the measurement signal can be achieved compared with the measures known hitherto. In particular, it is the case that the stress sensor on the supporting tube is influenced only slightly by the temperature of the medium flowing through the measuring tube. The stress sensor on the supporting tube is, however, influenced much more markedly by the stresses acting from outside on the Coriolis mass flowmeter, such as traction, compression or torsion, and the ambient temperature. The ambient temperature for its part can influence the stress sensor on the measuring tube only slightly, since the temperature of the measuring tube is essentially determined by the temperature of the medium flowing through the measuring tube. As a result, it is essentially information concerning external influences that is provided by the stress sensor provided on the supporting tube, so that, in combination with the information through the stress sensor for the stress state of the measuring tube, an improved measurement-signal correction dependent on length and stress is enabled overall.

There are various options for ascertaining the corrected measurement signal on the basis of the stress signal outputted by the stress sensor detecting the stress state of the measuring tube and the stress signal outputted by the stress sensor detecting the stress state of the supporting tube. Within the scope of a theoretical model, for example, the interrelationships and dependencies of the factors influencing the measurement signal can thus be ascertained from the stress states of the supporting tube and the measuring tube in order to obtain a correction function. As a rule, however, mathematical correction conventions for the measurement signal cannot be given in a closed form, so that recourse must be taken to iteration and approximation methods.

According to a preferred embodiment of the invention, provision is made such that an empirically determined correction function is provided in the correction device in order to ascertain the corrected measurement signal. To ascertain such a correction function, a medium with a known mass flow rate is for example passed through the measuring tube, and the stress states of the measuring tube and the supporting tube are determined with this known mass flow rate. A series of value triplets thus results, from which an empirical correction function can be determined by means of a matching procedure, a so-called fit procedure.

Various stress sensors can be used as the stress sensors for the stress state of the measuring tube and the supporting tube. In particular, it is not necessary for the stress sensors to be fixed directly on the measuring tube and on the supporting tube. Stress sensors for contactless stress measurement are in fact also known. According to a preferred development of the invention, however, provision is made such that length-change sensors, i.e. wire strain gauges in particular, are provided as stress sensors, with which wire strain gauges stress and length changes in the measuring tube and the supporting tube can be detected. Such wire strain gauges fixable on the measuring tube and on the supporting tube are well known from the prior art as measuring sensors for mechanical magnitudes, such as small expansions, compressions, bends and torsions as well as the respective elastic stresses. The effective measuring element of such a wire strain gauge consists, for example, of a thin resistance wire, which is applied in a looped or zigzag form on an expandable strip of a substrate material, such as plastic. If the wire strain gauge is applied on a deformable body, such as the measuring tube and the supporting tube of the Coriolis mass flowmeter, the wire strain gauge experiences, in the presence of loading, the same expansions or compressions as the measuring tube and the supporting tube itself, which leads to an elongation and transverse contraction of the resistance wire in the case of an expansion or to a shortening and transverse bulging of the resistance wire in the case of a compression and thus always to a change in the electrical resistance of the resistance wire. This change in the electrical resistance is proportional to the expansion or compression and thus, according to Hooke's law, to the elastic stress.

In principle, different orientations of the stress sensors on the supporting tube and the measuring tube come into consideration. According to a preferred development of the invention, however, provision is made such that the stress sensor detecting the stress state of the measuring tube is orientated in the longitudinal direction of the measuring tube and/or the stress sensor detecting the stress state of the supporting tube is orientated in the longitudinal direction of the supporting tube. In this way, it ensures that, in fact, the length changes detected by the stress sensors are changes in the actual oscillation length of the measuring tube and the actual length of the supporting tube.

Proceeding from the initially described method for correcting the measurement signal of a Coriolis mass flowmeter, the problem derived and expounded above is solved by the fact that the stress state of the supporting tube is detected and the measurement signal is corrected on the basis of the detected stress state of the measuring tube and the detected stress state of the supporting tube.

Preferred embodiments of the method according to the invention emerge, moreover, by analogy with the preferred embodiments of the Coriolis mass flowmeter according to the invention.

In detail, there are a large number of possibilities for configuring and developing the mass flowmeter according to the invention and the method according to the invention for correcting the measurement signal of a Coriolis mass flowmeter. In this regard, reference is made to the dependent claims and to the following detailed description of a preferred invention embodiment, reference being made to the drawing.

BRIEF DESCRIPTION OF THE DRAWING

In the drawing, the single FIGURE shows in cross-section a Coriolis mass flow-meter according to a preferred example of embodiment of the invention.

DESCRIPTION OF THE PREFERED EMBODIMENT

The Coriolis mass flowmeter shown in cross-section in the FIGURE has a single straight measuring tube 1, an oscillation generator 2 acting on measuring tube 1 and two measurement value sensors 3 detecting Coriolis forces and/ or Coriolis oscillations based on Coriolis forces. Furthermore, a supporting tube 4 for accommodating measuring tube 1, oscillation generator 2 and measurement value sensors 3 is provided. In order to detect the stress state of measuring tube 1, there is arranged thereon a stress sensor 5, i.e. in the form of a wire strain gauge. The latter is connected to a correction device 6 for correcting the measurement signal, in order to feed to said correction device the stress signal outputted by the stress sensor 5 detecting the stress state of measuring tube 1. Correction device 6 is further connected to measurement value sensors 3, in order also to feed the measurement signals coming from measurement value sensors 3 to correction device 6. As is well known, a signal proportional to the mass flow rate through measuring tube 1 emerges directly through the phase shift of the oscillation signals picked up by the two measurement value sensors 3.

Apart from stress sensor 5 for detecting the stress state of measuring tube 1, there is also provided a stress sensor 7 for detecting the stress state of supporting tube 4, also in the form of a wire strain gauge. The stress signal detected by stress sensor 7 on supporting tube 4 is also fed to correction device 6. A measurement signal corrected on the basis of the stress signal outputted by stress sensor 5 detecting the stress state of measuring tube I and the stress signal outputted by measurement value sensor 7 detecting the stress state of supporting tube 4 is then outputted by correction device 6, i.e. specifically a corrected signal for the mass flow rate through measuring tube 1.

Measuring tube 1 and supporting tube 4 are connected to one another in a manner excluding relative axial movements, whereby the axial spacing of the fixing points of supporting tube 4 on measuring tube 1 represents the oscillation length of measuring tube 1. Two connection rings 8 joined to the supporting tube at the ends are provided for fixing supporting tube 4 to measuring tube 1. Finally, an external accommodation cylinder 9 is provided as a housing for the Coriolis mass flowmeter, said accommodation cylinder accommodating the assembly unit consisting of measuring tube 1, oscillation generator 2, measurement value sensors 3, supporting tube 6 and connection rings 8. Accommodation cylinder 9 has two connection rings 10 joined at the ends, to which a joining flange 11 projecting outwards is joined in each case. Joining pipes 12 connected to measuring tube 1 project through connection rings 10 up to joining flange 1 1. According to the present preferred embodiment of the invention, measuring tube 1 and joining pipes 12 are designed in one piece, so that overall it involves a continuous pipe. In order to protect joining pipes 12, the latter are surrounded by a reinforcing cylinder 13.

With the Coriolis mass flowmeter according to the currently described preferred embodiment of the invention, therefore, a total of two wire strain gauges are provided, i.e. one for detecting the stress state of measuring tube 1 and one for detecting the stress state of supporting tube 4. As already explained in detail above, the oscillation length and the axial stress state of measuring tube 1, on the one hand, and the length and the axial stress state of supporting tube 4, on the other hand, can thus be ascertained, whereby length changes and the stress state of measuring tube 1 and supporting tube 4 are influenced to a differing degree by different influencing factors.

In particular, it is the case that stress sensor 7 on supporting tube 4 is influenced only slightly by the temperature of the medium flowing through measuring tube 1, but much more markedly by the stresses acting from outside on the Coriolis mass flowmeter, such as traction, compression or torsion, and the ambient temperature. The ambient temperature can, in turn, influence stress sensor 5 on measuring tube 1 only slightly, since the temperature of measuring tube 1 is essentially determined by the temperature of the medium flowing through measuring tube 1.

With the currently described Coriolis mass flowmeter according to the preferred embodiment of the invention, therefore, the information concerning the respective stress state originating respectively from measuring tube 1 and supporting tube 4 can be used jointly to correct the measurement signal, i.e. in respect of the measurement-signal influences dependent on length and stress, by the application of an empirically determined correction function in correction device 6. As a result, an effective error correction of the measurement signal can thus be obtained.

What is claimed is:

1. A mass flowmeter for flowing media which works on the Coriolis principle comprising, at least one straight measuring tube conveying the flowing medium, at least one oscillation generator acting on the measuring tube, at least one measurement value sensor detecting Coriolis forces and/or Coriolis oscillations based on Coriolis forces and outputting a measurement signal, a supporting tube accommodating the measuring tube, the oscillation generator and the at least one measurement value sensor, at least one first stress sensor for detecting the stress state of the measuring tube, wherein the first stress sensor comprises a length-change sensor, a correction device for correcting the measurement signal, the at least one measuring tube and the supporting tube being connected to one another at spaced-apart fixing points in a manner excluding relative axial movements and the axial spacing of said fixing points representing the oscillation length of the measuring tube, and the at least one measurement value sensor and the at least one first stress sensor being connected to the correction device, in order to feed to the correction device the measurement signal and the stress signal outputted by the at least one first stress sensor, and at least one second stress sensor detecting the stress state of the supporting tube, wherein the second stress sensor comprises a length-change sensor, said at least one second stress sensor being connected to the correction device in order to feed to the correction device the stress signal outputted by the at least one second stress sensor, so that a measurement signal can be outputted from the correction device that is corrected on the basis of the stress signal outputted by the at least one first stress sensor and the stress signal outputted by the at least one second stress sensor.

2. The mass flowmeter according to claim 1, wherein the correction device includes means for providing an empirically determined correction function for determining the corrected measurement signal.

3. The mass flowmeter according to claim 1 or 2, wherein said at least one first and second stress sensors comprise wire strain gages.

4. The mass flowmeter according to any one of claim 1 or 2, wherein said at least one first stress sensor is orientated in the longitudinal direction of the measuring tube and/or the at least one second stress sensor is orientated in the longitudinal direction of the supporting tube.

5. A mass flowmeter for flowing media, which works on the Coriolis principle comprising, at least one straight measuring tube conveying the flowing medium, at least one oscillation generator acting on the measuring tube, at least one measurement value sensor detecting Coriolis forces and/or Coriolis oscillations based on Coriolis forces and outputting a measurement signal, a supporting tube accommodating the measuring tube, the oscillation generator and the at least one measurement value sensor, at least one first stress sensor for detecting the stress state of the measuring tube, the first stress sensor being a wire strain gauge which is oriented in the longitudinal direction of the measuring tube, a correction device for correcting the measurement signal, the at least one measuring tube, and the supporting tube being connected to one another at spaced-apart fixing points in a manner excluding relative axial movements and the axial spacing of said fixing points representing the oscillation length of the measuring tube, and the at least one measurement value sensor and the at least one first stress sensor being connected to the corrective device, in order to feed the correction device the measurement signal and the stress signal outputted by the at least one first stress sensor, and at least one second stress sensor detecting the stress state of the supporting tube, the second stress sensor being a wire strain gauge which is oriented in the longitudinal direction of the supporting tube, said at least one second stress sensor being connected to the correction device in order to feed to the correction device the stress signal outputted by the at least one second stress sensor, so that a measurement signal can be outputted from the correction device that is corrected on the basis of the stress signal outputted by the at least one first stress sensor and the stress signal outputted by the at least one second stress sensor.

* * * * *